US006603593B2

(12) United States Patent
Fidric et al.

(10) Patent No.: US 6,603,593 B2
(45) Date of Patent: Aug. 5, 2003

(54) OPTICAL TRANSMISSION LINK INCLUDING RAMAN AMPLIFIER

(75) Inventors: Bernard G. Fidric, Cupertino, CA (US); Steven Sanders, Belmont, CA (US); Vincent G. Dominic, Fremont, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/956,595

(22) Filed: Sep. 19, 2001

(65) Prior Publication Data

US 2002/0181075 A1 Dec. 5, 2002

Related U.S. Application Data

(63) Continuation-in-part of application No. 09/804,986, filed on Mar. 13, 2001.

(51) Int. Cl.[7] ................................................ H01S 3/00
(52) U.S. Cl. ................................ 359/334; 359/341.3
(58) Field of Search ........................... 359/341.3, 334

(56) References Cited

U.S. PATENT DOCUMENTS

| | | | |
|---|---|---|---|
| 5,218,652 A | | 6/1993 | Lutz |
| 5,608,742 A | * | 3/1997 | Peterson .................... 372/6 |
| 5,659,559 A | | 8/1997 | Ventrudo et al. |
| 5,692,082 A | | 11/1997 | Fukushima |
| 5,812,583 A | * | 9/1998 | Peterson .................... 372/75 |
| 5,881,185 A | | 3/1999 | Feth et al. |
| 6,404,542 B1 | * | 6/2002 | Ziari et al. ............... 359/341.3 |
| 6,429,965 B1 | * | 8/2002 | Falquier et al. .......... 359/341.1 |

FOREIGN PATENT DOCUMENTS

| | | |
|---|---|---|
| EP | 0 877 265 A1 | 11/1998 |
| EP | 1 079 247 A2 | 2/2001 |
| EP | 1229673 A2 * | 7/2002 |

OTHER PUBLICATIONS

Patent Abstracts of Japan, vol. 12, No. 361, p. 763, (Fujikura Ltd; others: 01), May 18, 1988. Abstract.
Shen, Paisheng, "Fiber Recirculating Delay–Line Tunable Depolarizer", Applied Optics, Optical Society of America, Washington, US, vol. 37, No. 3, pp. 443–448, Jan. 20, 1998.
Ye, A.L., "New Fabrication Technique for High Performance Polarisation Maintaining Optical Fibre Couplers", Electronics Letters, IEE Stevenage, GB, vol. 30, No. 23, pp. 1971–1972, Nov. 10, 1994.
Shen, Paishen, "Tunable Singlemode Fibre Depolariser", Electronics Letters, IEE Stevenage, GB, vol. 33, No. 12, Jun. 5, 1997.

* cited by examiner

Primary Examiner—Mark Hellner
(74) Attorney, Agent, or Firm—Kurdirka & Jobse, LLP (57) ABSTRACT

An optical transmission system that employs a Raman amplifier including a Raman pump for introducing depolarized pump light into the fiber. The pump includes an optical source generating a polarized optical pump signal, an optical splitter that splits the pump signal into a first pump portion and a second pump portion, and a beam combiner that combines the first pump portion and the second pump portion into the depolarized pump light. Further, the pump includes a delay device, such as a length of fiber, that causes the first pump portion to propagate farther from the beam splitter to the beam combiner than the second pump portion. The length of fiber is longer than the coherence length of the pump signal.

53 Claims, 7 Drawing Sheets

OPTICAL TRANSMISSION LINK INCLUDING RAMAN AMPLIFIER

CROSS-REFERENCE TO RELATED APPLICATIONS

This application is a continuation-in-part application of U.S. patent application Ser. No. 09/804,986, filed Mar. 13, 2001, entitled "Depolarized Laser Sources".

BACKGROUND OF THE INVENTION

1. Field of the Invention

This invention relates generally to an optical fiber link including a Raman fiber amplifier that employs a depolarized pump source and, more particularly, to an optical communications system including a fiber transmission link having a Raman amplifier that employs a depolarized pump source.

2. Discussion of the Related Art

Optical communications systems employ optical transmission fibers to transmit optical signals carrying information over great distances. An optical fiber is an optical waveguide including a core having one index of refraction surrounded by a cladding having another, lower, index of refraction so that light signals propagating down the core at a certain angle of incidence are trapped therein. Typical optical fibers are made of high purity silica including certain dopant atoms that control the index of refraction of the core and cladding.

The optical signals are separated into optical packets to distinguish groups of information. Different techniques are known in the art to identify the optical packets transmitted through an optical fiber. These techniques include time-division multiplexing (TDM) and wavelength-division multiplexing (WDM). In TDM, different slots of time are allocated for the various packets of information. In WDM, different wavelengths of light are allocated for different data channels carrying the optical packets. More particularly, sub-bands within a certain bandwidth of light are separated by predetermined wavelengths to identify the various data channels.

When optical signals are transmitted over great distances through optical fibers, attenuation within the fibers reduces the optical signal strength. Therefore, detection of the optical signals over background noise becomes more difficult at the receiver. In order to overcome this problem, optical fiber amplifiers are positioned at predetermined intervals along the fiber, for example, every 80–100 km, to provide optical signal gain. Various types of fiber amplifiers are known that provide an amplified replica of the optical signal, and provide amplification for the various modulation schemes and bit-rates that are used.

A popular optical fiber amplifier for this purpose is an erbium doped fiber amplifier (EDFA) that provides optical amplification over the desired transmission wavelengths. EDFAs are common because erbium atoms provide light amplification over a relatively broad wavelength range, for example, 1525–1610 nm. The erbium-doped fiber within the EDFA is pumped by a pump laser at a certain excitation frequency, such as 980 nm or 1480 nm. These wavelengths are within the absorption bands of the erbium, and results in the generation of optical gain in the wavelength range of 1550 nm. Thus, for an optical amplifier having a signal with a wavelength of 1550 nm propagating through the erbium-doped fiber, the signal is amplified by the stimulated emission of 1550 nm energy when the fiber is pumped by a 980 nm pump source. The pump light is absorbed by the erbium atoms that cause electrons in the atoms to be elevated to higher states. When a photon in the optical signal being transmitted hits an excited erbium atom, a photon of the same wavelength and at the same phase is emitted from an elevated electron, which causes the electron to decay to a lower state to again be excited to a higher state by the pump photons. The optical signal is amplified by the generation of additional photons in this manner.

Another type of fiber amplifier sometimes employed in a fiber communications link is a Raman amplifier. A Raman amplifier provides amplification within the fiber itself by launching pump light into the fiber from a pump source. The pump light provides optical signal gain by stimulated Raman scattering along the length of the fiber. Semiconductor lasers are generally used in the pump source to generate the pump light, and a wavelength division multiplexer (WDM) is used to couple the pump light into the fiber. Typically, the wavelength of the pump light is about 100 nm less than the wavelength of the signal light to provide the amplification. For example, to amplify signal light in the C and L bands (1520–1600 nm), lasers generating pump light in the 1420–1500 nm wavelengths are used.

The pump light can be launched in either the co-propagating or counter-propagating direction relative to the propagation direction of the optical signal. However, counter-propagating pump light typically has advantages over co-propagating pump light. Most optical communications systems employing Raman amplification take advantage of the counter-propagating pump configuration, where the pump light propagates in the opposite direction to the signal light. Counter-propagating the pump light has the advantage of vastly reducing the amount of pump noise transferred onto the signal channels, as well as minimizing the problem of pump-mediated cross-talk. As reach and information capacity of transmission systems are pushed into even higher limits, the desire to utilize both co-propagating and counter-propagating Raman pump configurations is increasing. Co-propagating Raman pumping gives system performance benefits because the signal powers are maintained at a more uniform power level to route each span of the system.

A Raman amplifier is more desirable than an EDFA in some optical amplification applications because it is able to provide amplification along a long span of the fiber as opposed to the EDFA that only provides amplification in the EDFA fiber. Because the Raman amplifier provides amplification along a long length of the fiber span, the signal strength of the optical signal does not fall to as low of a level as in those systems that employ only EDFAs. Thus, the noise figure of the Raman amplifier is generally very low. Also, because the EDFA is spliced into the fiber as a separate component, insertion losses are typically higher with an EDFA than with a Raman amplifier.

Because lasers are used to generate both the signal light and the pump light in a Raman amplifier, both the signal light and the pump light will be circularly, elliptically or linearly polarized. The relative polarization of the pump light and the signal light affects the amount of gain the pump light provides, and is known as polarization dependent gain (PDG). Particularly, if the signal light and the pump light are polarized in the same direction, then the amplifier provides the most gain. If the signal light and the pump light are polarized 90° relative to each other, then there is virtually no gain. Relative polarizations between 0° and 90° provide different levels of gain depending on the angle. It has been found that a co-propagating Raman pump generally has a higher level of PDG compared to a counter-propagating pump at the same level of Raman gain and pump degree of polarization (DOP).

As the pump light and the signal light propagate through the fiber, their polarization will change as a result of various factors, including temperature, pressure, strain, etc., on the fiber. Further, each wavelength band for a particular channel in a WDM system may have a different polarization relative to the other bands. Therefore, the relative orientation of the polarization of the pump light and the signal light is not known at any given time. Hence, it is important that a Raman amplifier pump source provide non-polarized or depolarized pump light so that the amount of gain is not strongly dependent on the signal polarization.

In the past, different techniques have been used to "depolarize" the light from a polarized light source. One conventional method for converting polarized light to depolarized light is to combine the signals from two polarization maintaining ("PM") optical fibers so that their axes of polarization are at an angle of 90° relative to each other. Another method is shown in U.S. Pat. No. 5,692,082 in which polarized light from a laser diode is coupled into a PM fiber such that a plane of polarization of the light is at an angle of 45° relative to the polarization axis of the fiber. The length of the PM fiber is set so that an optical path length difference for the two polarization modes is greater than the coherence length of the incident light. Therefore, the two polarization modes are phase decorrelated, and the polarization state of the light output from the fiber is effectively randomized.

As discussed above, known Raman pump sources rely on combining an orthogonally polarized pair of semiconductor laser beams to obtain depolarized pump light. As is understood in the art, in order to maintain depolarized pump light, the power output of the two lasers must be maintained the same, or nearly the same. Depolarized pump light requires that the power from the individual lasers operate at equal levels throughout the operating lifetime of the amplifier. Inaccuracies in monitoring pump powers and changes in the insertion loss of optical components prior to combining the laser beams limit the accuracy with which the power in each polarization can be accurately controlled.

SUMMARY OF THE INVENTION

In accordance with the teachings of the present invention, an optical transmission system is disclosed that employs a Raman amplifier including an optical pump for introducing depolarized pump light into the fiber. The pump includes at least one optical source generating a polarized optical pump signal, and an optical splitter that splits the optical pump signal from the optical source into a first pump portion and a second pump portion. Further, the pump includes a delay device that delays the first pump portion relative to the second pump portion, and a beam combiner that combines the delayed first pump portion and the second pump portion to form the depolarized pump light.

In one embodiment, the delay device is a length of fiber that allows the first pump portion to propagate farther from the beam splitter to the beam combiner than the second pump portion. The length of fiber is longer than the coherence length of the pump signal. The pump may also employ two optical sources that apply two polarized pump signals to separate inputs of the beam splitter. In one embodiment, the system further includes at least one erbium doped fiber amplifier.

Additional objects, advantages, and features of the present invention will become apparent from the following description and appended claims, taken in conjunction with the accompanying drawings.

DETAILED DESCRIPTION OF THE EMBODIMENTS

The following discussion of the embodiments of the invention directed to an optical transmission system employing a Raman amplifier having a depolarized pump source is merely exemplary in nature and is not intended to limit the invention, or its applications or uses.

Figure 1:
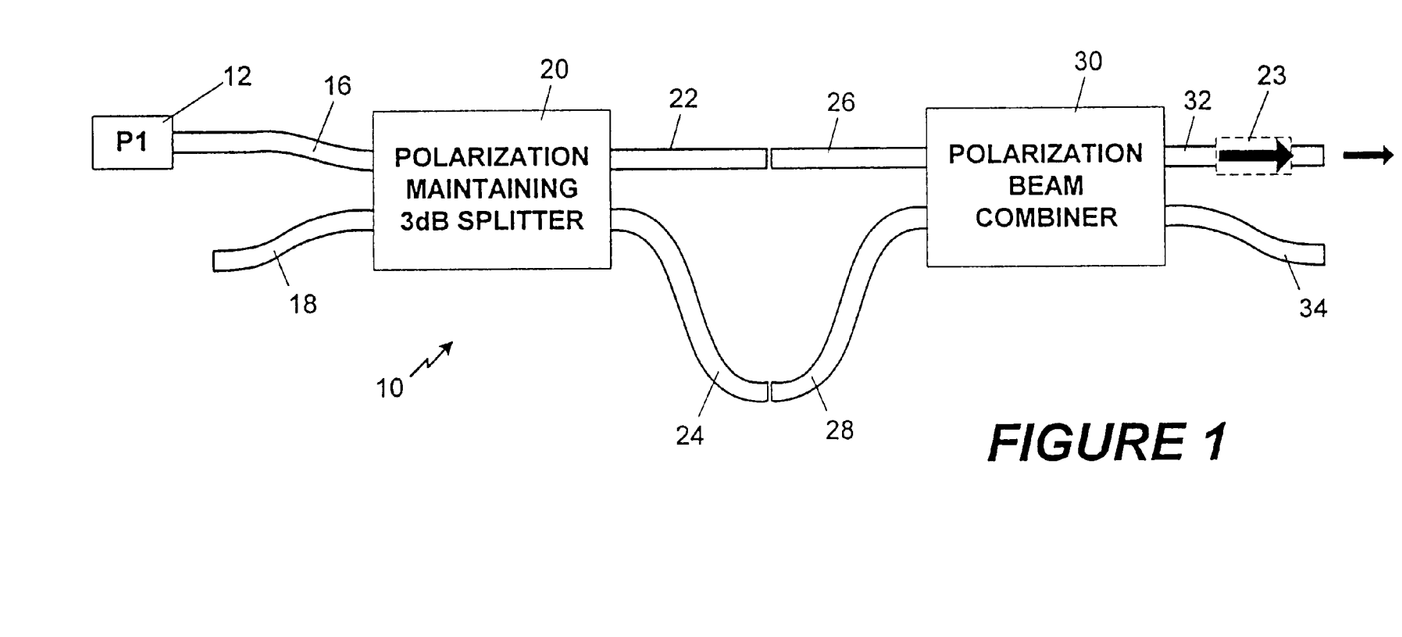
FIG. 1 is a schematic view of an embodiment of the invention in which a 3 dB splitter is used in conjunction with a polarization beam combiner.

Shown in FIG. 1 is a first embodiment of a depolarized optical pump 10 for a Raman amplifier, according to the present invention, including an optical pump source 12, such as a semiconductor laser. The optical source 12 has a polarized output, and is labeled P1. The source 12 may be grating stabilized and operates in the "coherence collapse" mode. That is, the wavelength of light from the source 12 is preferably well controlled and has a coherence length that is relatively short. Preferably, the source 12 has a coherence length of less than one meter, with longitudinal modes having a line width on the order of one gigahertz or more. The source 12 is linearly polarized along one of the polarization axes of a polarization maintaining (PM) fiber 16. For example, the light output from the pump source 12 might be coupled along the so-called "fast axis" of the fiber 16 or, alternatively, it might be coupled along the so-called "slow axis" of the fiber 16.

The PM fiber 16 is coupled to a polarization maintaining 3 dB splitter 20. Such a splitter is known in the art, and may be a fused fiber splitter/coupler consisting of two fused PM fibers. The fused fiber splitter 20 is a "50/50" type splitter that divides the light from the fiber 16 in half, and couples a portion of the light into two output fibers 22 and 24, each of which are also polarization maintaining fibers. Thus, each of the output fibers 22 and 24 carries approximately 50% of the light from the fiber 16. In an alternative embodiment, the splitter 20 may use bulk optics, having one or more lenses (e.g., graded index "GRIN" lenses) to collimate the light from the fiber 16 onto a beam splitter, and then refocus the two halves of the light into each of the output fibers 22 and 24. In such an embodiment, it may be preferable if "micro-optics" were used such that the splitter 20 could be housed in a single small package.

After passing through the polarization maintaining splitter 20, each of the fibers 22 and 24 contains approximately 50% of the light input to the splitter 20. The output fibers 22 and 24 are spliced to PM input fibers 26 and 28 of a polarization beam combiner (PBC) 30. The polarization axes of the fibers 22 and 26 are properly oriented at an angle of 0° or 90° relative to one another. That is, the fast axis of the fiber 22 is aligned with the fast axis of the fiber 26, or the fast axis of the fiber 22 is aligned with the slow axis of the fiber 26, such that the light contribution from the source 12 that is propagating through the fiber 22 and coupled into the fiber 26 exits an output fiber 32 of the PBC 30.

Similarly, the polarization axes of the fibers 24 and 28 are properly oriented relative to one another such that the light contribution from the source 12 that is propagating through the fiber 24 and is coupled into the fiber 28 also exits the fiber 32 of the PBC 30, but with a polarization orthogonal to the light originating in the fibers 22 and 26. For example, the polarization axes of the fibers 22 and 26 might be aligned with each other at the same angular orientation, while the polarization axes of the fibers 24 and 28 are at a relative angle of 90° to each other. Those skilled in the art will recognize that it would be equally effective to orient the polarization axes of the fibers 22 and 26 and the polarization axes of the fibers 24 and 28 such that essentially all the light from the source 12 would exit an output fiber 34 of the PBC 30.

The light in the input fibers 26 and 28 is coupled into the PBC 30. The total length of the fibers 22 and 26 is made significantly different than the total length of the fibers 24 and 28, so as to create a difference in the optical path length traveled by the two separate light beams. The difference in this optical path length is set to be greater than a coherence length of the pump source 12. This prevents any interference between the beams from occurring in the PBC 30. In one embodiment, the PBC 30 is a known optical device that combines two polarization states of the optical energy input via the fibers 26 and 28. It may be a fused fiber device that couples the two polarization modes from the fibers 26 and 28 into the output fiber 32. The output fiber 34 receives only a small amount of the light coupled into the PBC 30, and is referred to as a "ghost port." The PBC 30 effectively recombines, power wise, the two light beams that exit the splitter 20. Thus, the optical power of light exiting the PBC 30 is substantially the same as the total power originating from the pump source 12 (ignoring splice losses and insertion losses). However, the power has been split into two halves with phase decorrelated orthogonal polarizations. Thus, the resulting output beam in the fiber 32 is essentially unpolarized.

Under some circumstances, the pump 10 described above might be sensitive to optical feedback. In such a case it may be desirable to use an optical isolator 23 at the output of the PCB 30 in the fiber 32, as shown. Such optical isolators are well known in the art, and are widely used in other optical systems. In FIG. 1, the isolator 23 is shown in broken lines to indicate that it is an optional component.

Figure 2:
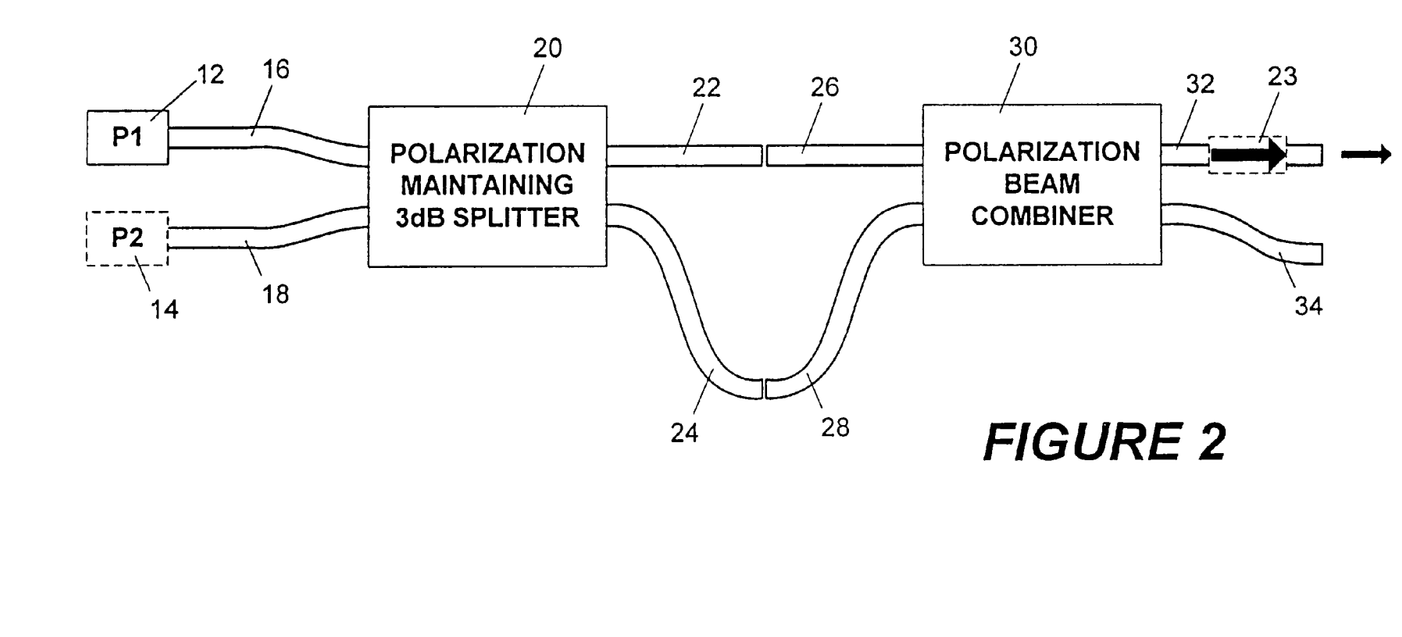
FIG. 2 is a schematic view of a variation of the embodiment of FIG. 1 in which multiple optical sources are used.

A variation of the embodiment of FIG. 1 is shown in FIG. 2. The pump shown in FIG. 2 is essentially identical to pump 10 of FIG. 1, except that a second pump source 14 is coupled into a second input fiber 18 of the polarization maintaining 3 dB splitter 20. The splitting provided by the splitter/coupler 20 is the same as in FIG. 1, except that the light from each of the sources 12 and 14 is divided between the fibers 22 and 24, rather than just the light from the source 12. Thus, the fibers 22 and 24 each contain approximately half of the light originating from each of the sources 12 and 14. The rest of the pump operates identically to that of FIG. 1, with the difference in the optical path length between the path consisting of the fibers 22 and 26 and the path consisting of the fibers 24 and 28, and the combining of both polarization modes in the PBC 30. Thus, the output on the fiber 32 is again unpolarized, except that the power being output is effectively doubled, due to the use of the two pump sources 12 and 14, rather than just one. Notably, the pump sources 12 and 14 do not have to emit light at the same frequency as long as their wavelengths are within the operating wavelength range of both the 3 dB splitter 20 and the PBC 30. Indeed, it may be desirable to use sources with different wavelengths so as to provide a depolarized output that has multiple wavelengths. Such a device might be particularly useful for the pumping of a Raman gain medium. As in FIG. 1, the isolator 23 is shown in the fiber 32 in broken lines to indicate that it may be used with the pump, if desired.

Figure 3:
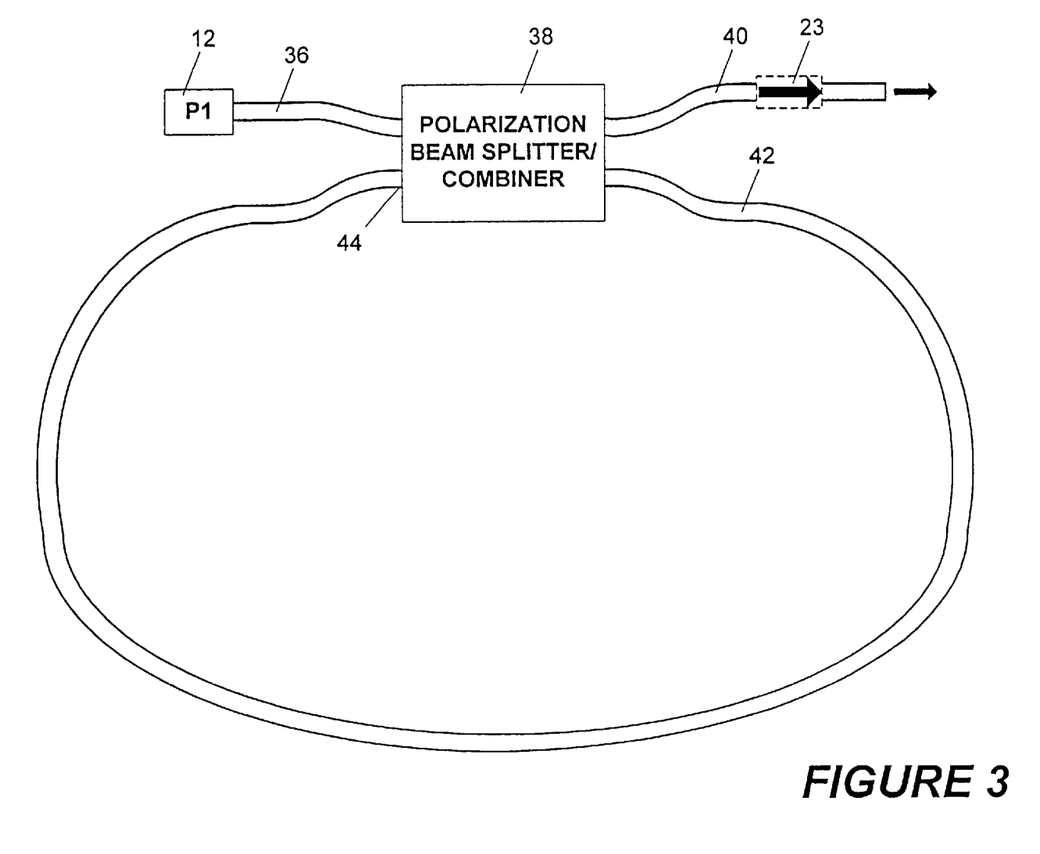
FIG. 3 is a schematic view of an embodiment of the invention in which a recirculation loop is used with a polarization beam combiner.

Shown in FIG. 3 is another embodiment of the invention that also makes use of the pump source 12 that has a predominantly linearly polarized output. In this embodiment, the source 12 couples light into a polarization maintaining optical fiber 36, which is coupled to a PBC 38. The PBC 38 has the same configuration as the PBC 30. However, in the embodiment of FIG. 3, the light is coupled into the fiber 36 such that its plane of polarization is at an angle relative to the polarization axis of the fiber 36. This angle is set in the vicinity of 45°, however, as discussed further below, the specific angle is determined through an optimization procedure involving monitoring of the output of the system.

The light along each of the fast and slow axes of the fiber 36 is divided by the PBC 38 such that it exits from different ports. For example, light traveling along the fast axis of the fiber 36 would exit through output polarization maintaining fiber 40, and light traveling along the slow axis of the fiber 36 would exit through polarization maintaining fiber 42. Of course, those skilled in the art will recognize that the invention might as easily have the light on the fast axis of the fiber 36 exit through the fiber 42, while the light on the slow axis exit through the fiber 40. The light that is coupled into the fiber 42 is recirculated back to a second input fiber 44 of the PBC 38. The light entering at the input fiber 44, still traveling along the same polarization axis of the fiber 42 as when it entered it, is directed to the output fiber 40. It is thereby combined with the light that had originally traveled along the other polarization axis of the fiber 36, and was coupled directly from the fiber 36 to the fiber 40. Preferably, the fiber 42 is long enough that the difference in optical path length between light traveling directly from the fiber 36 to the fiber 40 and light traveling through the fiber 42 is greater than the coherence length of the source 12. This minimizes the phase coherence between the two beams when they are coupled together in the output fiber 40.

In the embodiment of FIG. 3, the PBC 38 may be of the same configuration as described in previous embodiments, that is, it may be of a fused fiber type or of a micro-optic type. In order to maximize the unpolarized output of the fiber 40, it is desirable to balance the contributions along each of the two polarization axes of the fiber 40. With the plane of polarization of the light from the source 12 having an angle of 45° relative to the polarization axis of the input fiber 36, the initial contributions of the two polarization states are roughly equal. However, one of the polarization states is coupled through the fiber 42 and passes through the PBC 38 a second time. Therefore, it tends to suffer more losses than the other polarization state. If unadjusted, this would result in a lower relative intensity in the output fiber 40 for one of the two polarization states. Therefore, it is desirable to balance this output during fabrication of the device.

The output degree of polarization (DOP) may be monitored while the angular orientation of the fiber 36 is adjusted relative to the source 12. When the DOP of light from the fiber 40 is near a minimum value, a permanent splice may be made between the source 12 and the fiber 36 at the relative angular position that provided the minimum DOP output. Monitors capable of being used in this capacity are known in the art, and will be available to those practicing the invention. As in the previous embodiments, the isolator 23 is shown in the output fiber 40 in broken lines to indicate that it may be used with the source, if desired.

Figure 4:
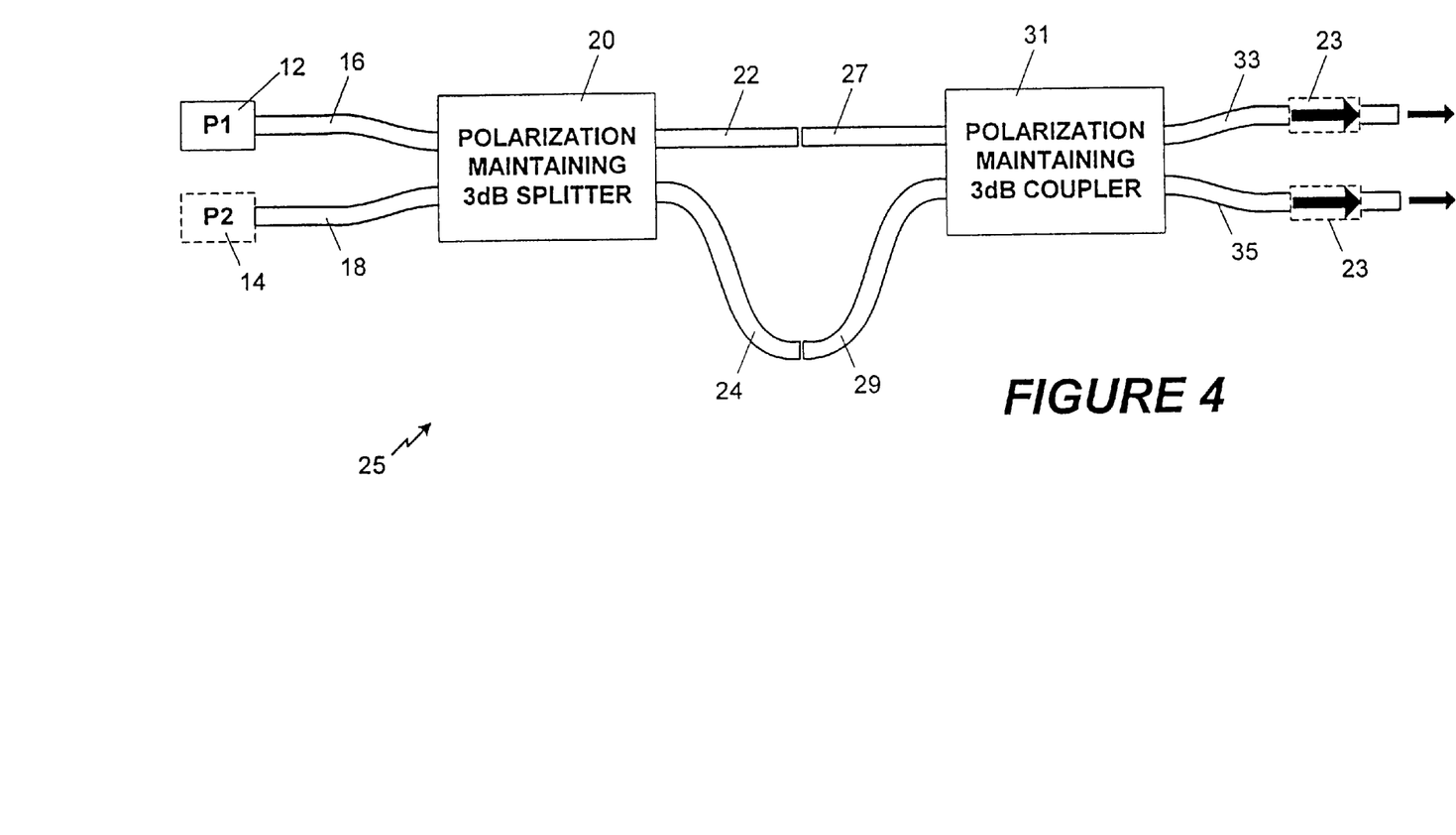
FIG. 4 is a schematic view of an embodiment of the invention in which a 3 dB splitter is used together with a 3 dB coupler to form a dual output source.

Depicted in FIG. 4 is a double optical pump 25 that is similar to the embodiments of FIGS. 1 and 2. Indeed, the first portion of the pump 25 is the same as in previous embodiments, with the polarization maintaining 3 dB splitter 20 receiving optical energy from the optical source 12 via the polarization maintaining fiber 16. The splitter 20 may also receive input optical energy from the optical source 14 via the polarization maintaining input fiber 18, as in the embodiment of FIG. 2, although this is optional. Depending on whether there are one or two input optical sources, the polarization maintaining fibers 22 and 24 will carry the same optical beams as discussed above in conjunction with either FIG. 1 or FIG. 2.

As in the previous embodiments, the relative angular orientation of the polarization axis of one of the two paths is rotated relative to the other prior to being coupled to a polarization maintaining 3 db coupler 31. The outputs of the fibers 22 and 24 are coupled to input fibers 27 and 29 of the coupler 31. The coupler 31 may be the same type of device as the splitter 20, but it is described as a coupler since a primary part of its function is to couple together the light input along the fibers 27 and 29. The combined light is then distributed in a roughly 50/50 proportion along output fibers 33 and 35. The angular orientation of the polarization axis of the fiber 29 may be 90° relative to that of the fiber 24, while the orientation of the polarization axis of the fiber 27 is aligned with that of the fiber 22. Thus, while the different optical contributions in the fibers 22 and 24 are in the same relative polarization states, they are at a 90° angle relative to each other when combined in the coupler 31.

Also similar to the previous embodiments is the optical path delay provided to one of the two output fibers 22 and 24 of the splitter 20. This delay is demonstrated schematically by showing the fibers 24 and 29 as being longer than the fibers 22 and 27. The actual length difference will be much greater so that the total optical path delay is greater than the coherence length of either of the optical sources 12 and 14. However, rather than all of the optical energy being output along one of the output fibers 33 or 35 of the coupler 31, it is split between the fibers 33 and 35. That is, contributions from each of the input fibers 27 and 29 may be found on the fibers 33 and 35. Since one of the two optical paths has been delayed, the two signals are effectively phase decorrelated in both of the output paths 33 and 35. Thus, two unpolarized outputs are generated.

It is noted that in FIG. 4, the optical source 14 is shown in dashed lines. This is to represent the fact that this source is optional, and that two unpolarized output beams would still be obtainable with only a single input source. However, by using the second source, the output power of the two signals may be effectively doubled. Moreover, by using two sources having slightly different center wavelengths, the effective bandwidth of each of the output signals may be made wider, which can be quite desirable, particularly when used as optical pumps. As in previous embodiments, the isolator 23 is shown in each of the output fibers 33 and 35 in broken lines to indicate that they may be used with the source, if desired.

Figure 5:
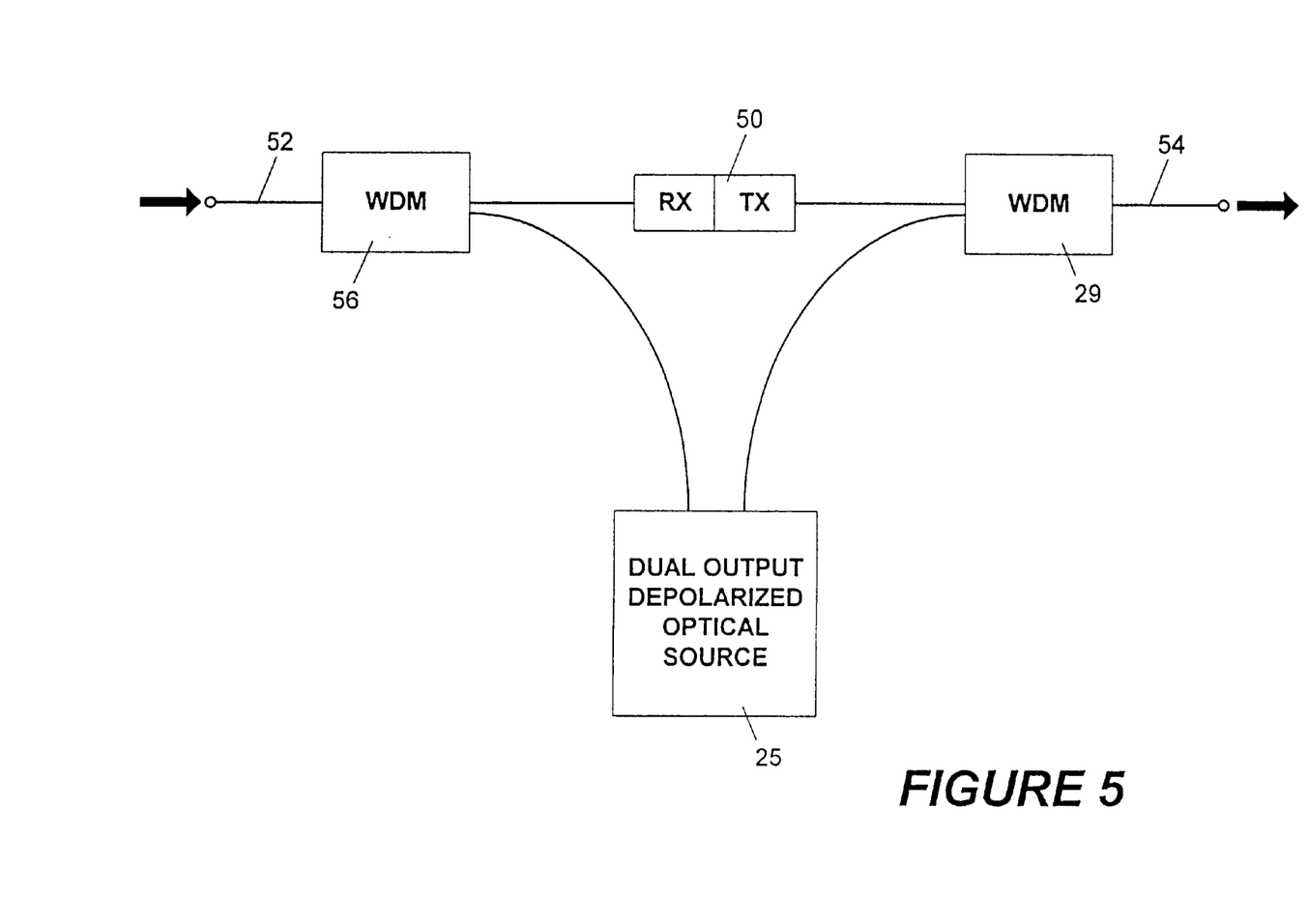
FIG. 5 is a schematic view of an application making use of a dual output depolarized optical source.

One possible application of a dual output depolarized pump 25 is shown in FIG. 5. The pump 25 has two optical outputs, each of which is effectively depolarized. The pump 25 is used at an optical regenerator site that includes a receiver/transmitter 50 used to convert between the optical and electrical signal domains. Such devices are well known in the art, and it will be understood that other electrical circuit components might also be used at the regenerator site for signal conditioning or other purposes. The signal arrives at the regenerator site from along an optical transmission link 52 and an output from the site along an output optical transmission link 54.

In order to boost signal power both on the incoming and the outgoing optical links, the two outputs from the pump 25 are coupled, respectively, to each of the links 52 and 54. A first output from the pump 25 is coupled via a wavelength division multiplexer (WDM) 56 to the link 52. The light from this output of the pump 25 counter-propagates with the incoming signal, and provides distributed optical gain via, for example, stimulated Raman scattering. As mentioned previously, the depolarized nature of the light from the optical source is particularly suited for Raman amplification. Similarly, the other output from the pump 25 is coupled into the link 54 via the WDM 58. The light from this output co-propagates with the signal output from the receiver/transmitter 50, and provides distributed gain to that output signal. Again, the effectively depolarized nature of the pump light is particularly suited to Raman amplification. Those skilled in the art will recognize that the pump 25 would typically be part of the regenerator site, along with the receiver/transmitter 50 and the WDMs 56 and 58. Of course, this is just one example application for the pump 25, as other uses are anticipated.

Figure 6:
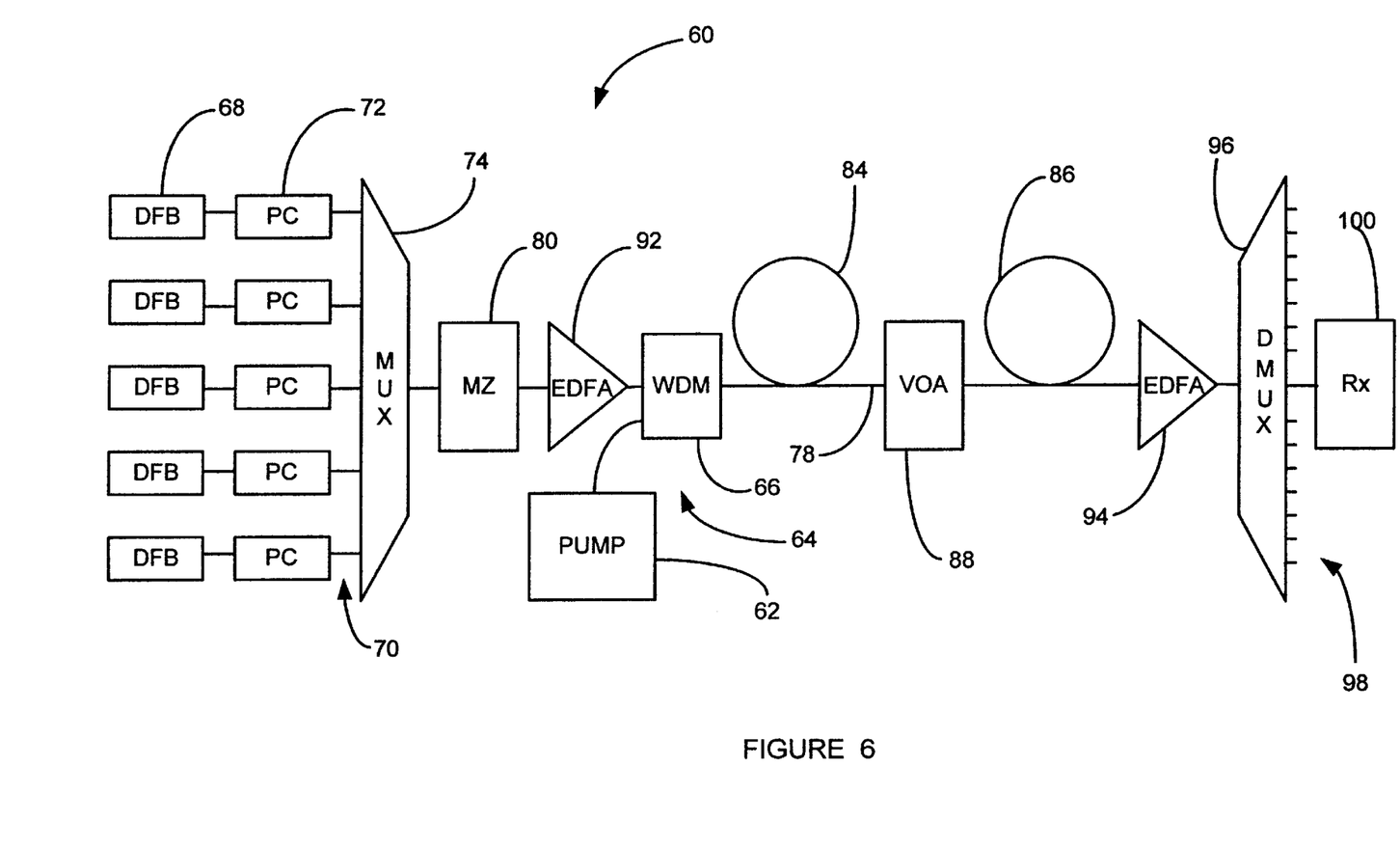
FIG. 6 is a schematic block diagram of a single-span transmission system employing a Raman amplifier having a pump source providing depolarized pump light, according to the invention.

FIG. 6 is a schematic block diagram of an optical transmission system 60 including a Raman pump source 62 associated with a Raman amplifier 64, according to an embodiment of the present invention. In this embodiment, the system 60 is a five channel, 100 GHz spaced, single-span transmission system. However, this is by way of a non-limiting example, in that any other suitable optical transmission system consistent with the discussion herein can be used. As will be discussed below, the Raman source 62 employs the various depolarized pumps discussed above to provide unpolarized pump light to reduce the PDG in the amplifier 64. In one embodiment, the pump source 62 is a low-DOP semiconductor Raman pump laser operating at 1455 nm, and producing approximately 200 mW at 1000 mA drive current.

The system 60 includes five distributed feed-back (DFB) lasers 68 placed on a 100 GHz frequency grid that generate an optical signal on each of five channels 70 that is modulated with the data being transmitted. The optical signal from each DFB laser 68 is sent through a polarization controller (PC) 72 that provides polarization maintaining functions for the optical signal. Each laser 68 is individually polarization controlled by the PCs 72 to insure that the modulator extinction ratio is maximized for each channel 70. Each channel 70 may include a grating (not shown) that provides wavelength control for the desired wavelength of the optical signal.

The polarization controlled optical signal in each channel 70 is then applied to a multiplexer 74 that multiplexes all of the optical signals on the several channels 70 into a single transmission link fiber 78 defined by two 50 km fiber spans 84 and 86. The power per channel 70 launched into the fiber spans 84 and 86 is approximately 3.3 dBm in this example. The optical signals on the fiber 78 are sent to a Mach-Zehnder (MZ) modulator 80 that modulates the data onto the various channels. In one embodiment, each channel 70 is modulated at 10.66 Gb/s by the modulator 80, where the modulator 80 is a $LiNbO_3$ modulator.

A variable optical attenuator (VOA) 88 separates the fiber spans 84 and 86. As the Raman pump power increases the VOA attenuation also increases to simulate a longer span.

Erbium doped fiber amplifiers (EDFAs) 92 and 94 are distributed along the fiber 78 at desirable distances. As is well understood in the art, and discussed above, EDFAs provide optical amplification over the desired transmission wavelengths. EDFAs are common because erbium atoms provide light amplification over a relatively broad wavelength range, for example, 1525–1620 nm. The erbium-doped fiber within the EDFA 92 or 94 is pumped by a pump laser at a certain excitation frequency, such as 980 nm or 1480 nm. The EDFAs 92 and 94 may include a gain flattening filter (GFF). As is well understood in the art, a GFF provides attenuation of the wavelengths of light that receive the most gain so that the gain of the amplifier over the entire amplified spectrum is substantially constant.

The fiber 78 is coupled to a demultiplexer 96 at the receiver end of the system 60. The demultiplexer 98 demultiplexes each channel 70 onto a separate output channel 98, where each channel 98 includes a suitable receiver 100 or detector for separating the data on the optical signal, as is well understood in the art.

Figure 7:
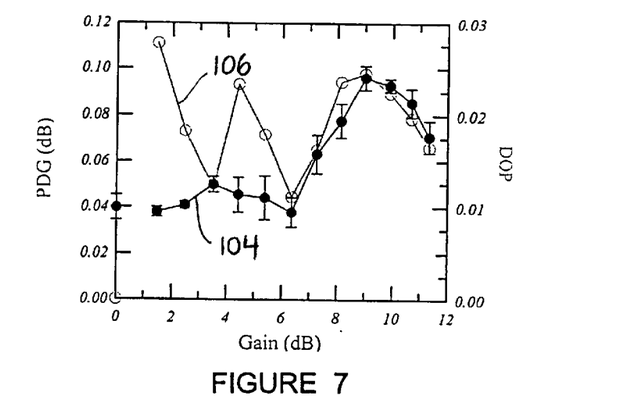
FIG. 7 is a graph showing polarization-dependent gain on the vertical axis as a function of the average Raman gain on the horizontal axis for a Raman pump source of the invention.

In a Raman amplifier, the amount of PDG depends on the total Raman gain in the system. Thus, the magnitude of the PDG as the gain increases is a good measure of whether the pump source has a sufficiently low degree of polarization (DOP). The PDG is defined herein as the difference between the maximum and minimum power readings for the signal as the signal polarization state is swept over the Poincare sphere. For this measurement, a single channel and an automatic polarization controller is utilized to systematically sweep the signal polarization state. In one embodiment, the polarization-dependent loss (PDL) of the span is approximately 0.04 dB. As the Raman gain increases, the maximum PDG is measured at about 0.10 dB. The DOP is stable in time and is low enough that the PDG is within system design tolerances. FIG. 7 is a graph showing polarization-dependent gain on the vertical axis as a function of the average Raman gain on the horizontal axis as represented by graph line 104. The variation of the pump DOP is shown on the right axis for the same pump power settings, and is represented by graph line 106.

Figure 8:
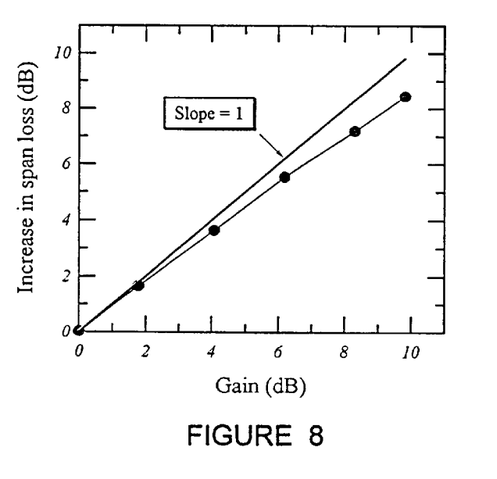
FIG. 8 is a graph with increase in span loss on the vertical axis and gain on the horizontal axis showing the amount by which span loss can be increased while still maintaining a certain bit error rate for the transmission system shown in FIG. 6.

The system benefit of the co-propagating Raman gain was measured by increasing the Raman pump power and measuring the amount of additional attenuation that can be inserted into the span while still maintaining a fixed bit-error rate (BER) of $10^{-10}$ at the receiver. FIG. 8 is a graph with increase in span loss on the vertical axis and gain on the horizontal axis that shows this response.

In general, the loss can be increased by less than the maximum value because of several effects. These effects include (1) introduction of Raman ASE into the system; (2) increase four-wave mixing with increased signal channel power; (3) pump mediated cross-talk; and (4) effects from double Rayleigh scattering.

Figure 9:
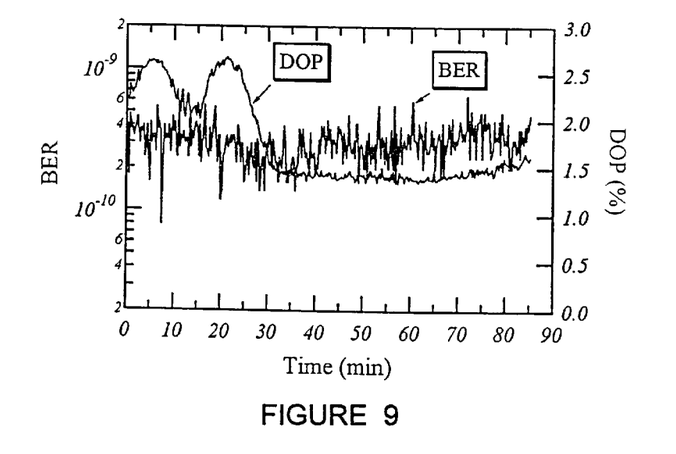
FIG. 9 is a graph with bit error rate on the vertical axis and time on the horizontal axis showing pump degree of polarization for the pump source of the invention.

For a co-propagating Raman amplification configuration, it is critical for system performance that the pump degree of polarization be stable in time so that the BER does not vary due to polarization-dependent gain effects. The BER performance of the system 60 was measured over the course of 1.5 hours and found that the BER variation was minimal. FIG. 9 is a graph with BER on the vertical axis and time on the horizontal axis showing the variation of the BER and the pump DOP. The VOA 88 was adjusted to get a BER of $3 \times 10^{-10}$. Note that the signal polarization state was intentionally swept over the Poincare sphere during these measurements with an automatic polarization controller inserted after the front-end booster amplifier.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical transmission system for transmitting an optical signal, said system comprising:
    an optical transmission fiber for transmitting the signal; and
    a Raman amplifier coupled to the fiber and amplifying the signal propagating therethrough, said Raman amplifier including an optical pump source for introducing depolarized pump light into the fiber, said pump source including at least one optical source generating a polarized optical pump signal, an optical splitter that splits the optical pump signal from the optical source into a first pump portion and a second pump portion, a delay device that delays the first pump portion relative to the second pump portion, and a beam combiner that receives the delayed first pump portion and the second pump portion and combines the pump portions to form the pump light, wherein the pump light includes optical energy in at least two orthogonal polarization states so that the pump light is depolarized.

2. The system according to claim 1 wherein the optical splitter is a polarization maintaining 3 dB splitter having a polarization maintaining input port and at least two output ports.

3. The system according to claim 1 wherein the delay device is a length of fiber that allows the first beam portion to propagate farther from the beam splitter to the beam combiner than the second beam portion.

4. The system according to claim 3 wherein the length of fiber has a length greater than the coherence length of the pump signal.

5. The system according to claim 1 wherein the optical splitter and the beam combiner are part of the same optical device, said splitter and combiner device receiving the pump signal at one input.

6. The system according to claim 5 wherein the delay device includes a fiber loop coupled to another input and an output of the splitter and combiner device.

7. The system according to claim 6 wherein the fiber loop is a polarization maintaining fiber.

8. The system according to claim 1 wherein the at least one optical source is two optical sources, and wherein the beam splitter receives and splits the polarized optical pump signal from both optical sources.

9. The system according to claim 8 wherein the two optical sources have different center frequencies.

10. The system according to claim 1 wherein the optical source operates in coherence collapse.

11. The system according to claim 1 wherein the beam combiner is a polarization maintaining coupler.

12. The system according to claim 11 wherein the polarization maintaining coupler includes at least two outputs wherein each output includes pump light having optical energy in at least two orthogonal polarization states so that the pump light is depolarized.

13. The system according to claim 11 wherein the polarization maintaining coupler is a 3 dB coupler that provides about the same optical output intensity at the two outputs.

14. The system according to claim 13 wherein the outputs are coupled to the transmission fiber so that pump light is provided in the co-propagating direction and the counter-propagating direction in the fiber relative to the propagation direction of the optical signal.

15. The system according to claim 1 further comprising at least one erbium doped fiber amplifier coupled to the fiber, said erbium doped fiber amplifier amplifying the optical signal.

16. The system according to claim 1 further comprising a multiplexer, said multiplexer being responsive to a plurality of optical input signals and multiplexing the optical input signals onto the fiber.

17. The system according to claim 16 further comprising a demultiplexer, said demultiplexer demultiplexing the optical signals on the fiber into a plurality of output channels.

18. An optical transmission system for transmitting an optical transmission signal, said system comprising:
    an optical transmission fiber for transmitting the transmission signal; and
    a pump source for introducing depolarized pump light into the fiber, said pump source including at least one optical source generating a polarized pump signal, an optical splitter that splits the pump signal from the optical source into a first pump portion and a second pump portion, a delay device that delays the first pump portion relative to the second pump portion, and a beam combiner that receives the delayed first pump portion and the second pump portion and combines the pump portions to form the pump light, wherein the pump light includes optical energy in at least two orthogonal polarization states so that the pump light is depolarized.

19. The system according to claim 18 wherein the pump source is associated with a Raman amplifier, said Raman amplifier amplifying the transmission signal within the fiber.

20. The system according to claim 19 wherein the pump source is coupled to the fiber with a WDM.

21. The system according to claim 18 wherein the delay device is a length of fiber that allows the first beam portion to propagate farther from the beam splitter to the beam combiner than the second beam portion.

22. The system according to claim 21 wherein the length of fiber has a length greater than the coherence length of the pump signal.

23. The system according to claim 18 wherein the optical splitter and the beam combiner are part of the same optical device, said splitter and combiner device receiving the pump signal at one input.

24. The system according to claim 23 wherein the delay device includes a fiber loop coupled to another input and an output of the splitter and combiner device.

25. The system according to claim 24 wherein the fiber loop is a polarization maintaining fiber.

26. The system according to claim 18 wherein the optical splitter is a polarization maintaining 3 dB splitter having a polarization maintaining input port and at least two output ports.

27. The system according to claim 18 wherein the at least one optical source is two optical sources, and wherein the beam splitter receives and splits the polarized optical pump signal from both optical sources.

28. The system according to claim 27 wherein the two optical sources have different center frequencies.

29. The system according to claim 18 wherein the optical source operates in coherence collapse.

30. The system according to claim 18 wherein the beam combiner is a polarization maintaining coupler.

31. The system according to claim 30 wherein the polarization maintaining coupler includes at least two outputs wherein each output includes pump light having optical energy in at least two orthogonal polarization states so that the pump light is depolarized.

32. The system according to claim 30 wherein the polarization maintaining coupler is a 3 dB coupler that provides about the same optical output intensity at the two outputs.

33. The system according to claim 32 wherein the outputs are coupled to the transmission fiber so that pump light is provided in the co-propagating direction and the counter-propagating direction in the fiber relative to the propagation direction of the optical signal.

34. The system according to claim 18 further comprising at least one erbium doped fiber amplifier coupled to the fiber, said erbium doped fiber amplifier amplifying the optical signal.

35. The system according to claim 18 further comprising a multiplexer, said multiplexer being responsive to a plurality of optical input signals and multiplexing the optical input signals onto the fiber.

36. The system according to claim 35 further comprising a demultiplexer, said demultiplexer demultiplexing the optical signals on the fiber into a plurality of output channels.

37. An optical communications system for transmitting optical signals on a fiber link, said system comprising:
    a plurality of input channels, each input channel including a laser generating an optical signal and a polarization controller for controlling the polarization of the optical signal;
    a multiplexer responsive to the optical signals in the plurality of input channels, said muliplexer multiplexing the plurality of optical signals onto a single output;
    a single span fiber coupled to the output of the multiplexer and receiving the plurality of optical signals therefrom;
    a pump source for introducing depolarized pump light into the fiber, said pump source including at least one optical source generating a polarized pump signal, an optical splitter that splits the pump signal from the optical source into a first pump portion and a second pump portion, a delay device that delays the first pump portion relative to the second pump portion, and a beam combiner that receives the delayed first pump portion and the second pump portion and combines the pump portions to form the pump light, wherein the pump light includes optical energy in at least two orthogonal polarization states so that the pump light is depolarized;
    a demultiplexer coupled to and receiving the plurality of optical signals on the fiber, said demuliplexer demultiplexing the plurality of optical signals into a plurality of outputs; and a plurality of output channels coupled to the outputs of the demultiplexer, each output channel including a receiver.

38. The system according to claim 37 wherein the pump source is associated with a Raman amplifier, said Raman amplifier amplifying the optical signal within the fiber.

39. The system according to claim 38 wherein the pump source is coupled to the fiber with a WDM.

40. The system according to claim 37 wherein the delay device is a length of fiber that allows the first beam portion to propagate farther from the beam splitter to the beam combiner than the second beam portion.

41. The system according to claim 40 wherein the length of fiber has a length greater than the coherence length of the pump signal.

42. The system according to claim 37 wherein the optical splitter and the beam combiner are part of the same optical device, said splitter and combiner device receiving the pump signal at one input.

43. The system according to claim 42 wherein the delay device includes a fiber loop coupled to another input and an output of the splitter and combiner device.

44. The system according to claim 43 wherein the fiber loop is a polarization maintaining fiber.

45. The system according to claim 37 wherein the optical splitter is a polarization maintaining 3 dB splitter having a polarization maintaining input port and at least two output ports.

46. The system according to claim 37 wherein the at least one optical source is two optical sources, and wherein the beam splitter receives and splits the polarized optical pump signal from both optical sources.

47. The system according to claim 46 wherein the two optical sources have different center frequencies.

48. The system according to claim 37 wherein the optical source operates in coherence collapse.

49. The system according to claim 37 wherein the beam combiner is a polarization maintaining coupler.

50. The system according to claim 49 wherein the polarization maintaining coupler includes at least two outputs wherein each output includes pump light having optical energy in at least two orthogonal polarization states so that the pump light is depolarized.

51. The system according to claim 49 wherein the polarization maintaining coupler is a 3 dB coupler that provides about the same optical output intensity at the two outputs.

52. The system according to claim 51 wherein the outputs are coupled to the transmission fiber so that pump light is provided in the co-propagating direction and the counter-propagating direction in the fiber relative to the propagation direction of the optical signal.

53. The system according to claim 37 further comprising at least one erbium doped fiber amplifier coupled to the fiber, said erbium doped fiber amplifier amplifying the optical signal.

* * * * *